ABSTRACT

United States Patent [19]
Pastore

[11] 4,408,240
[45] Oct. 4, 1983

[54] MULTICHANNEL MAGNETIC HEAD FOR A RECORDER-REPRODUCER SYSTEM

[75] Inventor: David C. Pastore, Berlin, N.J.
[73] Assignee: RCA Corporation, New York, N.Y.
[21] Appl. No.: 290,499
[22] Filed: Aug. 6, 1981

Related U.S. Application Data

[63] Continuation of Ser. No. 87,450, Oct. 22, 1979, abandoned.

[30] Foreign Application Priority Data

Aug. 23, 1979 [GB] United Kingdom ............... 7929476

[51] Int. Cl.³ .......................... G11B 5/27; G11B 5/28
[52] U.S. Cl. ................................. 360/121; 360/119; 360/104
[58] Field of Search ............... 360/121, 119, 122-123, 360/125, 107

[56] References Cited

U.S. PATENT DOCUMENTS

| | | | |
|---|---|---|---|
| 3,549,822 | 12/1970 | Chupity | 360/121 X |
| 3,716,677 | 2/1973 | Tanaka et al. | 360/121 |
| 3,978,523 | 8/1976 | Tanaka et al. | 360/121 |
| 4,110,902 | 9/1978 | Tamura et al. | 360/121 X |
| 4,318,146 | 3/1982 | Ike et al. | 360/84 |

FOREIGN PATENT DOCUMENTS

| | | | |
|---|---|---|---|
| 2218969 | 4/1973 | Fed. Rep. of Germany | 360/121 |
| 2065746 | 9/1975 | Fed. Rep. of Germany | 360/121 |
| 2039126 | 7/1980 | United Kingdom | |

OTHER PUBLICATIONS

IBM/TDB, vol. 20, No. 1, Jun. 1977, pp. 14-15, "Dual Gap Ferrite Head", by Albrecht et al.
IBM/TDB, vol. 8, No. 7, Dec. 1965, p. 952, "Offset Cores for Reduced Gap-to-Gap Spacing", by McClung.
IBM/TDB, vol. 19, No. 3, Aug. 1976, pp. 790-791, "Skewed Servo Write Head", by Barsotti et al.
IBM/TDB, vol. 17, No. 4, Sep. 1974, pp. 1168-1169, "Phase Sensing Magnetic Recording Head", by Jansen.
IBM/TDB, vol. 19, No. 8, Jan. 1977, p. 2927, "Magnetic Head", by Golaski et al.
IBM/TDB, vol. 17, No. 4, Sep. 1974, pp. 979-980, "Multielement Servoing Head", by McCormick.

Primary Examiner—John H. Wolff
Attorney, Agent, or Firm—E. M. Whitacre; W. H. Meise; R. G. Coalter

[57] ABSTRACT

In a multichannel head of the type wherein a plurality of transducers scan signal tracks of information across a magnetic tape within a system; and wherein each transducer includes a magnetic core having two pole pieces between which a gap is disposed while at least one turn of a conductor is magnetically coupled to the gap, the plurality of transducers are sequentially bonded together in an integral unit with their gaps disposed at essentially tandem locations.

2 Claims, 10 Drawing Figures

3
MULTICHANNEL MAGNETIC HEAD FOR A RECORDER-REPRODUCER SYSTEM

This is a continuation of application Ser. No. 087,450, filed Oct. 22, 1979 now abandoned.

BACKGROUND OF THE INVENTION

Multichannel recorder-reproducer systems are known in which transducers are individually mounted to concurrently scan separate tracks across a magnetic tape, such as in a longitudinal or helical manner. Consistent with required signal to noise ratios, each track must be narrow in width and all tracks must be precisely parallel along the direction of track scan, if recording space on the tape is not to be wasted. Since each transducer is mounted at a separate location along a perpendicular to the direction of tape travel in many prior art systems, recording space on the tape is wasted thereby due to the mounting tolerance and dimensional build-ups incurred therewith. Individual transducers are spaced along the direction of track scan in other prior art systems, to avoid the dimensional build-up incurred from the multiple mounting provisions of the transducers. However, this results in greater length of contact travel between the transducer arrangement and the tape, so that the pressure exerted therebetween has a greater distance over which to vary. Fabrication techniques are disclosed in U.S. Pat. Nos. 3,544,982 and 3,634,933 for mounting a plurality of transducers in a compact magnetic head unit which substantially resolves these tolerance and dimensional build-up problems in applications which utilize guardbands to reduce crosstalk between adjacent channels.

SUMMARY OF THE INVENTION

The multichannel magnetic head of this invention substantially resolves the previously discussed tolerance and dimensional build-up problems for all applications, especially those which do not utilize guardbands. In this magnetic head the plurality of transducers are sequentially bonded together in an integral unit with their gaps disposed at essentially tandem locations.

BRIEF DESCRIPTION OF THE DRAWINGS

The present invention will be understood from the following description, the appended claims, and the attached drawings wherein:

FIG. 2a is a top view of a multichannel magnetic head in accordance with another preferred embodiment of the invention;

FIG. 2b illustrates a portion of tape that is scanned by the multichannel magnetic head of FIG. 2a;

FIG. 4a is a top view of a multichannel magnetic head in accordance with a further preferred embodiment of the invention; and FIG. 4b illustrates a portion of tape that is scanned by the multichannel magnetic head of FIG. 4a.

DESCRIPTION OF THE PREFERRED EMBODIMENTS

Figures 1A, 1C:
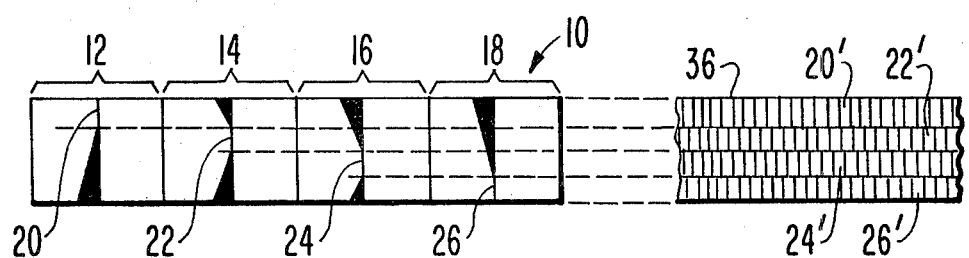
FIGS. 1a and 1b are the top and side views of a multichannel magnetic head in accordance with one preferred embodiment of the invention.
FIG. 1c illustrates a portion of tape that is scanned by the multichannel magnetic head of FIGS. 1a and 1b.
Figure 1B:
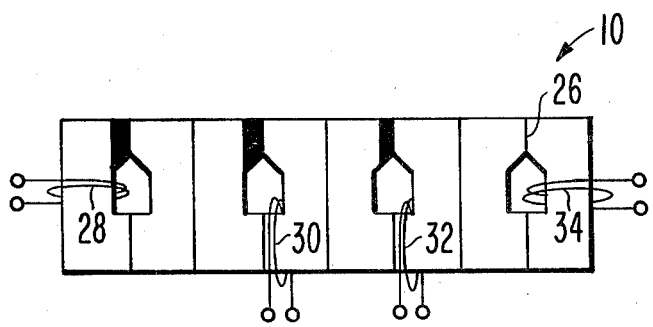

One preferred embodiment of a multichannel magnetic head 10 in accordance with this invention is shown in FIGS. 1a (top view), and 1b (side view) wherein four transducers 12, 14, 16, and 18 are sequentially bonded together in an integral unit. Each of the transducers 12–18 include two pole pieces which are notched to define magnetic gaps 20, 22, 24, and 26 at essentially tandem locations. Each gap 20–26 is magnetically coupled through at least one turn of a conductor, such as the separate coils of wire 28, 30, 32, and 34 which are disposed about one pole piece in each transducer 12–18 to control or pick up the magnetic field flowing therein. Although the multichannel magnetic head 10 is very compact and quite small, FIGS. 1a and 1b are greatly expanded for the sake of clarity. The top surface of the multichannel magnetic head 10 is arcuately contoured (not shown) in most applications and a portion of the tape 36 travels thereover so that the gaps, 20, 22, 24, and 26 respectively, scan tracks 20', 22', 24', and 26' thereon, as shown in FIG. 1c. When a contoured surface is utilized, measures are taken in fabrication to assure that an equal depth from the contoured surface is maintained for all of the gaps 20–26. The coils of wire 28, 30, 32, and 34 are connected within a recorder-reproducer system (not shown) to either record signals onto the tracks 20', 22', 24', and 26' or reproduce signals therefrom. Because the transducers 12, 14, 16 and 18 are bonded together in an integral unit, only mounting tolerances for that unit are encountered in the recorder-reproducer system, rather than the build-up of such tolerances that is encountered when the plurality of transducers are individually mounted. Also, the dimensional build-up due to the multiple mounting provisions which are necessary when the plurality of transducers are individually mounted, is avoided. Although fabrication tolerances are encountered with the integral unit of the multichannel magnetic head 10, the gaps 20, 22, 24, and 26 are compactly located in tandem along the direction of tape travel. Therefore, the contact travel between the magnetic head 10 and the tape 36 is reduced, so that the pressure exerted therebetween has less distance over which to vary as compared with prior art tandem arrangements of magnetic transducers. Furthermore, the tandem arrangements of those gaps permits the tracks 20'–26' to be disposed immediately adjacent to each other without any guardbands therebetween. Consequently, a more efficient utilization of recording space on the magnetic tape in the recorder-reproducer system is accomplished with the compact multichannel magnetic head 10 of this invention as compared in prior art.

The multichannel magnetic head 10 of this invention may be fabricated using any of several known techniques. As shown in FIGS. 1a and 1c, the scan width of each gap 20, 22, 24, and 26 and the relative locations of those gaps along perpendiculars to the direction of tape travel, are determined by the depth to which the pole pieces of each transducer 12, 14, 16, and 18 are notched. Therefore, the scan width of each gap 20–26 may be as narrow as desired and where guardbands are desired between the tracks 20'–26', the relative location of the gaps 20–26 along perpendiculars to the direction of tape travel may be spaced accordingly. Furthermore, magnetic shields (not shown) of conventional design may be disposed between adjacent transducers in the multichannel magnetic head 10 to reduce crosstalk. The transducers 12, 14, 16, and 18 are bonded together using any suitable non-magnetic material, such as glass. The notches in the pole pieces of each transducer 12, 14, 16, and 18 may be filled with non-magnetic material, such as glass, and this may be accomplished concurrently with the transducers 12, 14, 16, and 18 being bonded together. Although each pole piece could be machined or ground separately, a technique is known whereby each transducer 12, 14, 16, and 18 is cut from a loaf. Two pieces of magnetic material are configured and joined in the loaf to provide the desired cross-sectional configuration of the transducers, such as that shown generally in FIG. 1b. The gap length between the pole pieces is therefore determined by a portion of the interface between the pieces of magnetic material that are joined in the loaf and by depositing non-magnetic spacing material in that portion of the interface such as with a sputter process, the gap lengths may be precisely determined.

Figures 2A, 2B:
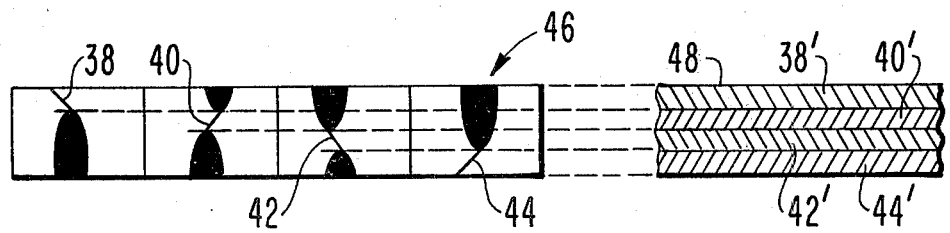

FIGS. 2a and 2b illustrate another embodiment of the invention wherein biased magnetic gaps 38, 40, 42, and 44 are disposed in a multichannel magnetic head 46 to scan tracks 38', 40', 42', and 44' on a portion of a magnetic tape 48. As is commonly known in the art, biased magnetic gaps are those which have their scanning widths angularly disposed relative to perpendiculars across the direction of tape travel, with the angles of adjacently scanning gaps being in adjacent quadrants relative to such perpendiculars. Consequently, one adjacently scanning biased gap is disposed at an angle less than 90° relative to the direction of tape travel while the other is disposed at an angle greater than 90°. The pole pieces of each transducer in this embodiment may be fabricated using the same known techniques as those discussed previously, however, the biased gaps somewhat complicate the necessary machining process. As is known in the art, crosstalk is substantially reduced between signals of certain wavelengths on the tracks 38', 40', 42', and 44' of tape 48 due to the biased gaps 38, 40, 42, and 44 of the multichannel magnetic head 46. Furthermore, the relative locations of the magnetic gaps 38-44 across the direction of tape travel may be spaced to provide guardbands, or magnetic shields may be disposed between adjacent transducers in the multichannel magnetic head 46 as was discussed previously in regard to the multichannel magnetic head 10.

Figures 3A, 3C:
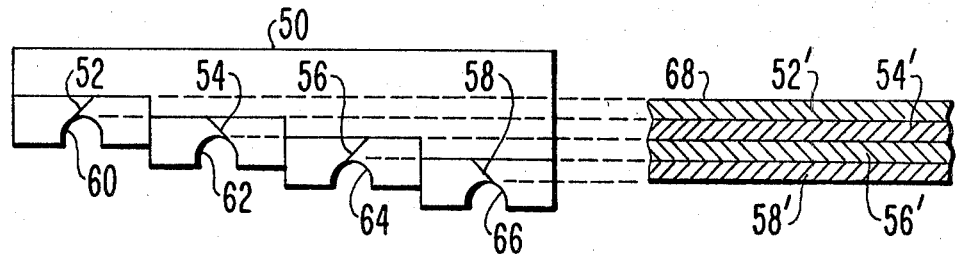
FIGS. 3a and 3b are the top and side views of a multichannel magnetic head in accordance with still another preferred embodiment of the invention.
FIG. 3c illustrates a portion of tape that is scanned by the multichannel magnetic head of FIGS. 3a and 3b.
Figure 3B:
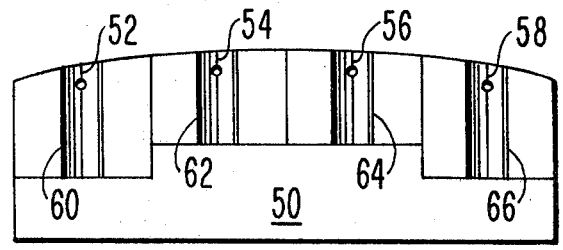

To facilitate the fabrication of the magnetic heads shown in FIGS. 1a and 1b or 2a, a stepped carrier 50 may be used as shown in FIGS. 3a (top view) and 3b (side view). The transducers with the magnetic gaps 52, 54, 56, and 58 are individually bonded in the separate steps of the carrier 50. The pole pieces of each transducer could be individually machined and joined on the appropriate step of the carrier 50 or the transducers could be cut from a loaf as previously discussed. After each transducer is bonded to the carrier 50, notches 60, 62, 64, and 66 would then be ground into each transducer to determine the width and relative location of the tracks 52', 54', 56', and 58' to be scanned on a tape 68 as shown in FIG. 3c. Separate coils of wire (not shown) are disposed about one pole piece in each transducer to control or pick up the magnetic field flowing therein in a manner similar to that shown and described for the magnetic head 10 of FIGS. 1a and 1b. Although the gaps 52-58 are shown to be biased in this embodiment these gaps could be oriented perpendicularly across the direction of tape travel and the notches 60-66 could be ground to allow for guardbands or magnetic shields could be disposed to reduce crosstalk. As shown in FIG. 3b the top surface of this magnetic head is contoured while gap depth equality is maintained by disposing the transducers at offsets in the integral unit.

Figures 4A, 4B:
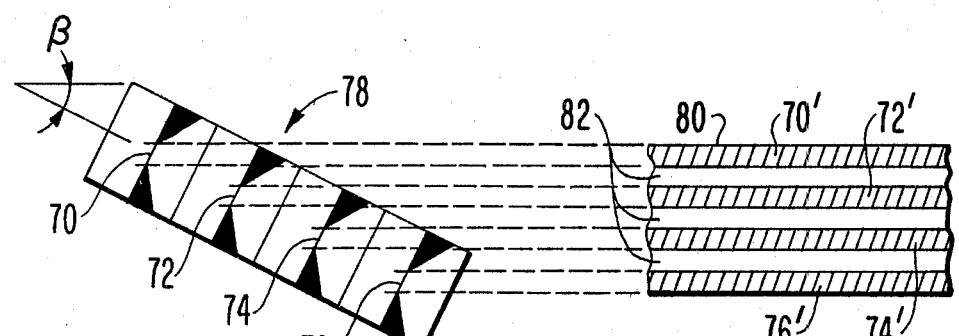

Due to configuration symmetries, fabrication economies are possible in another embodiment of the invention. This embodiment is illustrated in FIGS. 4a and 4b where magnetic gaps 70, 72, 74, and 76 are spaced apart at desired distances and aligned in tandem along the elongated axis of a multichannel magnetic head 78. Because each transducer can be substantially identical in this embodiment, the pole pieces thereof can be fabricated in large quantities at appreciably lower costs. The multichannel magnetic head 78 is mounted within a recorder-reproducer system (not shown) with its elongated axis at an angle beta ($\beta$) to the direction of tape travel so that the gaps 70, 72, 74, and 76 scan tracks 70', 72', 74', and 76' across a portion of tape 80. Angle $\beta$ is set in this embodiment to provide guardbands 82 between the adjacent tracks and crosstalk is reduced thereby between the signals on those tracks. The scan width of the tracks 70'-76' and the width of the guardbands 82 can be varied in this embodiment depending on the magnitude of angle $\beta$, with narrower tracks and wider guardbands being realized as beta is increased. Furthermore, angle $\beta$ could be set to scan immediately adjacent tracks on tape 80 in still another embodiment of the invention and magnetic shields could be disposed between adjacent transducers in the multichannel magnetic head 78 to reduce crosstalk as was previously discussed. Also, the gaps in this embodiment could be bias oriented therein to reduce the crosstalk or oriented to scan perpendicularly across the direction of tape travel, when the multichannel magnetic head is disposed at the desired angle $\beta$ within the recorder-reproducer system.

What I claim is:

1. A multichannel magnetic transducer head arrangement for transducing parallel tape tracks in a video tape recorder, comprising:

a plurality of individual transducers, each transducer including first and second magnetic pole pieces, said first and second pole pieces defining a block with first and second parallel sides having a predetermined width and also defining a face substantially orthogonal to said first and second sides, said face being adapted for operative contact with magnetic tape, said first and second pole pieces defining said face being separated by a magnetic gap in said face, said gap lying in a plane substantially parallel with said first and second sides and having a width equal to that of said width of said pole pieces, the length of said gap being small over a predetermined portion of the width of said pole pieces and gradually becoming larger over at least a portion of the remainder of said width, each of said plurality of transducers having said small portion of said gap along a different portion of said width; and nonmagnetic bonding means for mechanically bonding together said plurality of individual transducers along adjacent ones of said parallel sides with said faces of said transducers lying substantially in the same plane and with said gaps lying in parallel planes, said bonding means producing magnetic isolation between the pole pieces of adjacent transducers for reducing crosstalk between said transducers whereby said small portion of each of said gaps can scan across a different lateral portion of said tape with substantially no separation between said tracks.

2. A multichannel magnetic transducer head arrangement for transducing parallel tape tracks in a video tape recorder, comprising:

a plurality of individual transducers, each transducer including first and second magnetic pole pieces, said first and second pole pieces defining a block with first and second parallel sides having a predetermined width and also defining a face substantially orthogonal to said first and second sides, said face being adapted for operative contact with magnetic tape, said first and second pole pieces defining said face being separated by a magnetic gap in said face, said gap lying in a plane substantially parallel with said first and second sides and having a width equal to that of said width of said pole pieces, the length of said gap being small over a predetermined portion of the width of said pole pieces and gradually becoming larger over at least a portion of the remainder of said width, each of said plurality of transducers having said small portion of said gap along a different portion of said width; and means for mechanically positioning said plurality of individual transducers side-by-side with said gaps aligned in tandem for scanning said tape and with adjacent transducers effectively magnetically decoupled whereby the small portion of each gap scans a different portion of said tape and crosstalk is reduced.

* * * * *